Wheeler. v. Bascom.
Clover Harvester.

No. 15449.   Patented July 29 1856.

UNITED STATES PATENT OFFICE.

C. B. WHEELER AND A. BASCOM, OF STEUBEN, OHIO.

IMPROVEMENT IN CLOVER-SEED HARVESTERS.

Specification forming part of Letters Patent No. 15,449, dated July 29, 1856.

*To all whom it may concern:*

Be it known that we, C. B. WHEELER and AUSTIN BASCOM, of Steuben, in the county of Huron and State of Ohio, have invented a new and Improved Machine for Gathering Clover-Seed from Standing Stalks; and we do hereby declare that the following is a full, clear, and exact description of the same, reference being had to the annexed drawings, making a part of this specification, in which—

Figure 1:
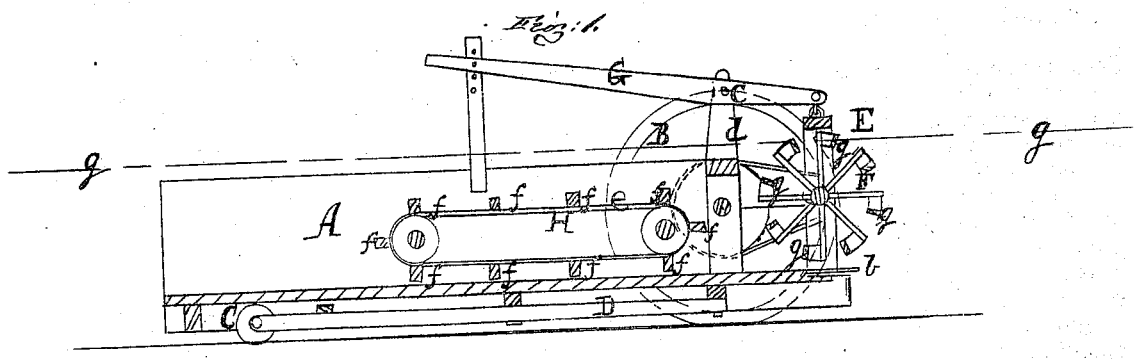
Figure 2:
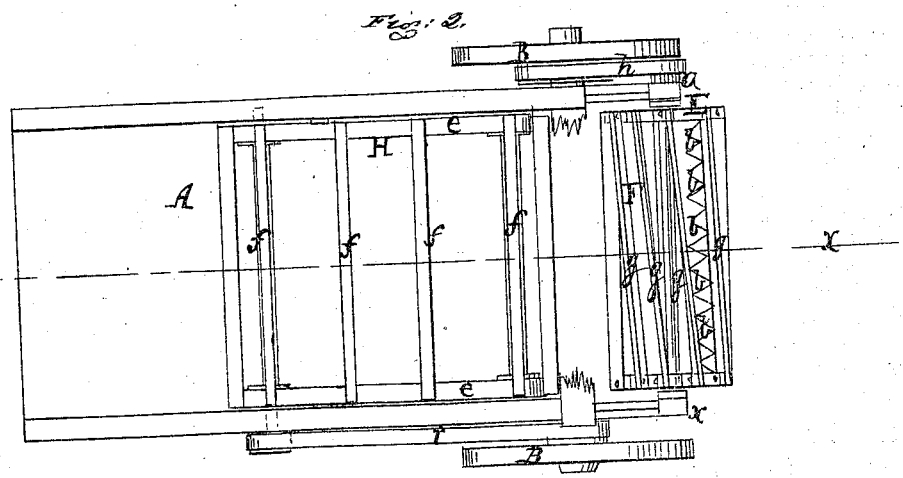

Figure 1 is a longitudinal vertical section of our improvement, $x\ x$, Fig. 2, showing the plane of section. Fig. 2 is a horizontal section of the same, $y\ y$, Fig. 1, showing the plane of section.

Similar letters of reference indicate corresponding parts in the two figures.

Our invention consists in the employment or use of a reel and cutters placed within a sliding frame, and an endless apron placed within the body of the vehicle, the above parts being arranged and operating as will be hereinafter fully shown and described.

To enable those skilled in the art to fully understand and construct our invention, we will proceed to describe it.

A represents a rectangular box, which is placed upon three wheels, B B C, the two wheels B B being at the front part of the box, and the wheel C being at the back part, the wheel C being attached to one end of a bar, D, which has its opposite end pivoted to the bottom of the box A, as shown in Fig. 1. The bar D is allowed to swing or turn on its pivot, and the wheel C consequently assists in turning the box A.

At the front end of the box A a frame, E, is placed, said frame being fitted between uprights $a\ a$, grooved at their inner sides. In the frame E a reel, F, is placed, and in the lower end of the frame, just below the reel F, a series of triangular or saw-shaped teeth, $b$, are placed side by side, similar to the sickle of a harvesting-machine. The teeth $b$ are permanent, however, or do not vibrate.

To the upper end of the frame E a lever, G, is attached, said lever working on a pivot, $c$, in an upright bar, $d$, attached to the body A.

Within the body A there is placed an endless apron, H. This may be constructed of belts or chains $e\ e$, having transverse slats $f$ attached to it.

A draft-pole or shafts are attached to the front part of the body A, and as the body A is drawn along the clover-heads pass between the teeth $b$, and the reel F strikes against the clover-heads, which are cut off and are thrown within the body A, the endless apron H conveying them to the back part of the body A.

The frame E may be raised and lowered and secured at any desired point to suit the height of the stalks by adjusting the lever G.

The blades or beaters $g$ of the reel may be of curved spiral form, as shown in Fig. 2.

The reel F is driven by a belt, $h$, from the hub of one of the wheels B, and the endless apron is driven by a belt, $i$, from the hub of the opposite wheel, as shown in Fig. 2.

Having thus described our invention, what we claim as new, and desire to secure by Letters Patent, is—

The reel F and cutters or teeth $b$, placed within the sliding or adjustable frame E, in combination with the endless apron H, the above parts being arranged as shown, for the purpose as set forth.

C. B. WHEELER.
A. BASCOM.

Witnesses:
JOHN K. BRANT,
LEWIS WOOD.